(12) United States Patent
Farnsworth

(10) Patent No.: US 12,095,247 B2
(45) Date of Patent: Sep. 17, 2024

(54) GANG BOX LID

(71) Applicant: John Taylor Chong Farnsworth, Toquerville, UT (US)

(72) Inventor: John Taylor Chong Farnsworth, Toquerville, UT (US)

( * ) Notice: Subject to any disclaimer, the term of this patent is extended or adjusted under 35 U.S.C. 154(b) by 195 days.

(21) Appl. No.: 17/702,913

(22) Filed: Mar. 24, 2022

(65) Prior Publication Data
US 2022/0311227 A1    Sep. 29, 2022

Related U.S. Application Data

(60) Provisional application No. 63/166,750, filed on Mar. 26, 2021.

(51) Int. Cl.
*H02G 3/08* (2006.01)

(52) U.S. Cl.
CPC .................................. *H02G 3/081* (2013.01)

(58) Field of Classification Search
None
See application file for complete search history.

(56) References Cited

U.S. PATENT DOCUMENTS

| | | | | |
|---|---|---|---|---|
| 746,580 A * | 12/1903 | Russell | ................ | H01R 25/006 174/67 |
| 1,173,040 A * | 2/1916 | Sargent | ................ | H02G 3/185 174/57 |
| 1,699,172 A * | 1/1929 | Weiland | ................ | H01H 13/70 200/5 E |
| 3,305,658 A * | 2/1967 | Heyhal | ................ | H01H 13/04 200/295 |
| 3,501,610 A * | 3/1970 | Willcox | ................ | H01H 13/04 200/345 |
| 3,699,236 A * | 10/1972 | Kodaira | ................ | H02G 3/14 200/295 |
| 4,968,856 A * | 11/1990 | Bowley | ................ | H01R 13/447 174/67 |
| 9,560,784 B1 * | 1/2017 | Elbaz | ................ | H05K 5/03 |
| 10,103,533 B1 * | 10/2018 | Gretz | ................ | H02G 3/26 |
| 2002/0117386 A1 * | 8/2002 | Clegg | ................ | H01H 13/70 200/5 R |
| 2003/0094358 A1 * | 5/2003 | Bui | ................ | H01H 9/02 200/341 |
| 2006/0070763 A1 * | 4/2006 | Herth | ................ | H02G 3/10 174/58 |
| 2012/0231657 A1 * | 9/2012 | Bouse | ................ | H02G 3/185 439/535 |
| 2018/0033572 A1 * | 2/2018 | Ockert | ................ | G08B 3/10 |
| 2020/0328041 A1 * | 10/2020 | Isoda | ................ | H01H 13/10 |
| 2021/0257170 A1 * | 8/2021 | Blair | ................ | H05K 5/03 |

* cited by examiner

*Primary Examiner* — Krystal Robinson

(57) ABSTRACT

A gang box lid has an outer surface, an inner surface, an outer lip defining an interior lid space, and a retractable protrusion. The outer lip has an inner perimeter larger than the external perimeter of a gang box so that the interior lid space receives the gang box and any protrusions on an exterior edge of the gang box opening. In some examples, the retractable protrusion is slidable within an aperture. In some examples, the retractable protrusion is hinged to the outer surface.

3 Claims, 8 Drawing Sheets

GANG BOX LID

CROSS-REFERENCE TO RELATED APPLICATIONS

This application claims the benefit of U.S. Provisional Application Ser. No. 63/166,750 filed on Mar. 26, 2021, which is incorporated herein by reference.

TECHNICAL FIELD

The present disclosure relates to electrical boxes—commonly referred to as receptacles or gang boxes—in building construction. More particularly, the present disclosure relates to a lid for gang boxes.

BACKGROUND

Homes and other structures often use sheet material like plasterboard, wallboard, or gypsum board for interior walls. One of the most challenging parts of installing sheet material is cutting around all of the receptacles without cutting too large of an opening or without damaging the contents within the receptacles. For example, most receptacles are cut around using either a drill bit, knife, or other cutting tool. The quickest and most efficient method to cut around a receptacle is to hang the sheet material, locate and mark the receptacle, then cut around the outside edges of the receptacle. In order to do this correctly, a user will typically estimate the location of the receptacle and attempt to puncture the inside of the receptacle with their preferred cutting tool. The user will then move the cutting tool horizontally or vertically until making contact with an inner wall of the receptacle. With the receptacle wall located, the user will then move/jump the cutting tool to the opposite side of the receptacle wall and will attempt to trace the outside perimeter of the receptacle with the cutting tool, thereby cutting the sheet material. It can be easy to make mistakes, even for professionals, since many receptacles are made of thin plastic. For example, a cutting tool can easily cut into the receptacle walls, which are typically less than ⅛ inch thick. It can be very difficult to locate the inside and outside walls of receptacles, thus resulting in poor cutouts and/or damaged receptacles and wires. Further, most receptacles also have a couple of protrusions on the outside wall. These protrusions are used as guides to position the receptacle onto the wood framing. In order to cut sheet material around receptacles, it is necessary to also cut around these two small protrusions. These two small protrusions make cutting around the receptacle more challenging, which can lead to inaccurate cuts.

Additionally, cutting around receptacles can be very time consuming due to the quantity of receptacles in a home. For example, even a one room re-model might require cutting around a dozen or more receptacles. If any of the receptacles are damaged, or the hole is cut too large, the repairs are time consuming and costly. Once the hole is cut, the receptacle and its contents are exposed, which allows mud, texturing, paint, dust, and other items into the receptacle. The wiring is also exposed.

In an attempt to solve these problems, other inventions have helped to locate receptacles (e.g., U.S. Pat. Nos. 6,708,421, 6,055,736) and mark sheet material (e.g., U.S. Pat. No. 7,363,720), but these inventions do not protect the contents within the receptacle and are complicated to use. In addition, these inventions do not help with the actual process of cutting around a receptacle. Other inventions, like specialized drill bits with guide points, have helped with the process for cutting around a receptacle without damaging the receptacle; however, these bits do not help locate, mark, or protect the contents within a receptacle.

Therefore, there is a need for an apparatus that helps locate a gang box behind sheet material, aids a user in cutting around the gang box, and protects the contents of the gang box. The present disclosure seeks to solve these and other problems.

SUMMARY OF EXAMPLE EMBODIMENTS

In some embodiments, a gang box lid comprises an outer surface, an inner surface, an outer lip defining an interior lid space, and a retractable protrusion. The outer lip has an inner perimeter larger than the external perimeter of a gang box so that the interior lid space receives the gang box and any protrusions on an exterior edge of the gang box opening. In some embodiments, the retractable protrusion is slidable within an aperture. In some embodiments, the retractable protrusion is hinged to the outer surface.

DETAILED DESCRIPTION OF EXAMPLE EMBODIMENTS

Figure 1:
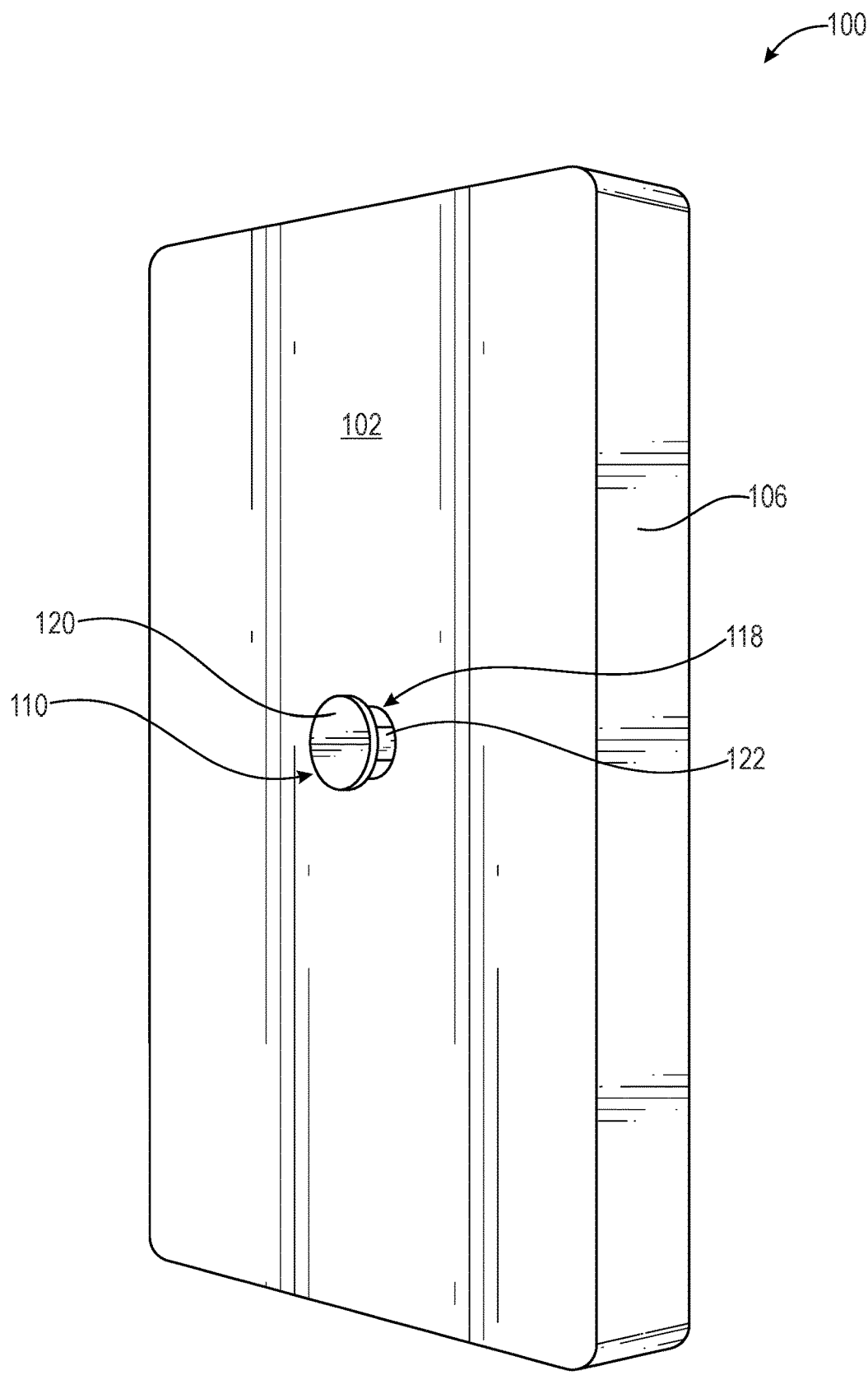
FIG. 1 illustrates a front perspective view of a gang box lid.
Figure 2:
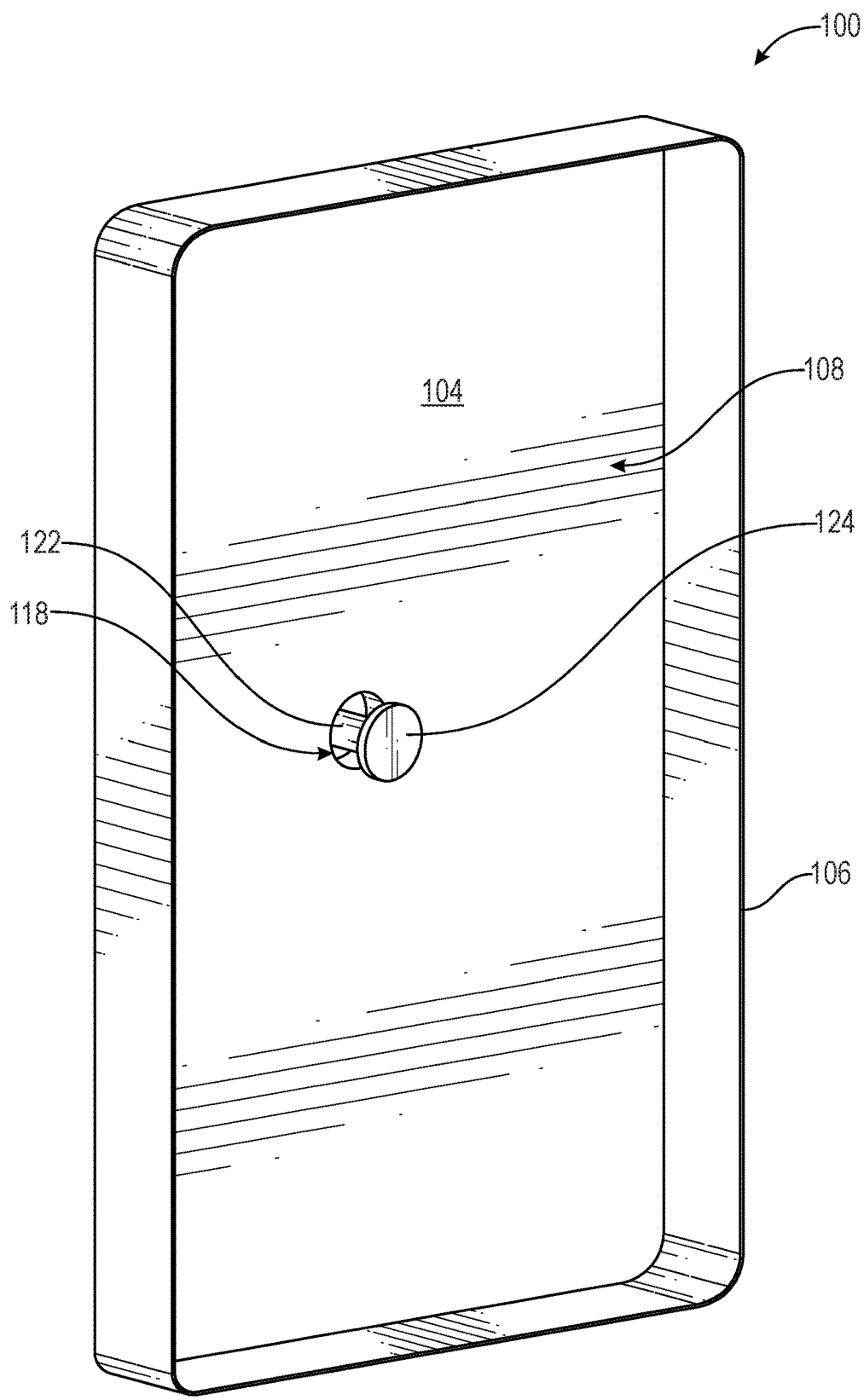
FIG. 2 illustrates a rear perspective view of a gang box lid.
Figure 3:
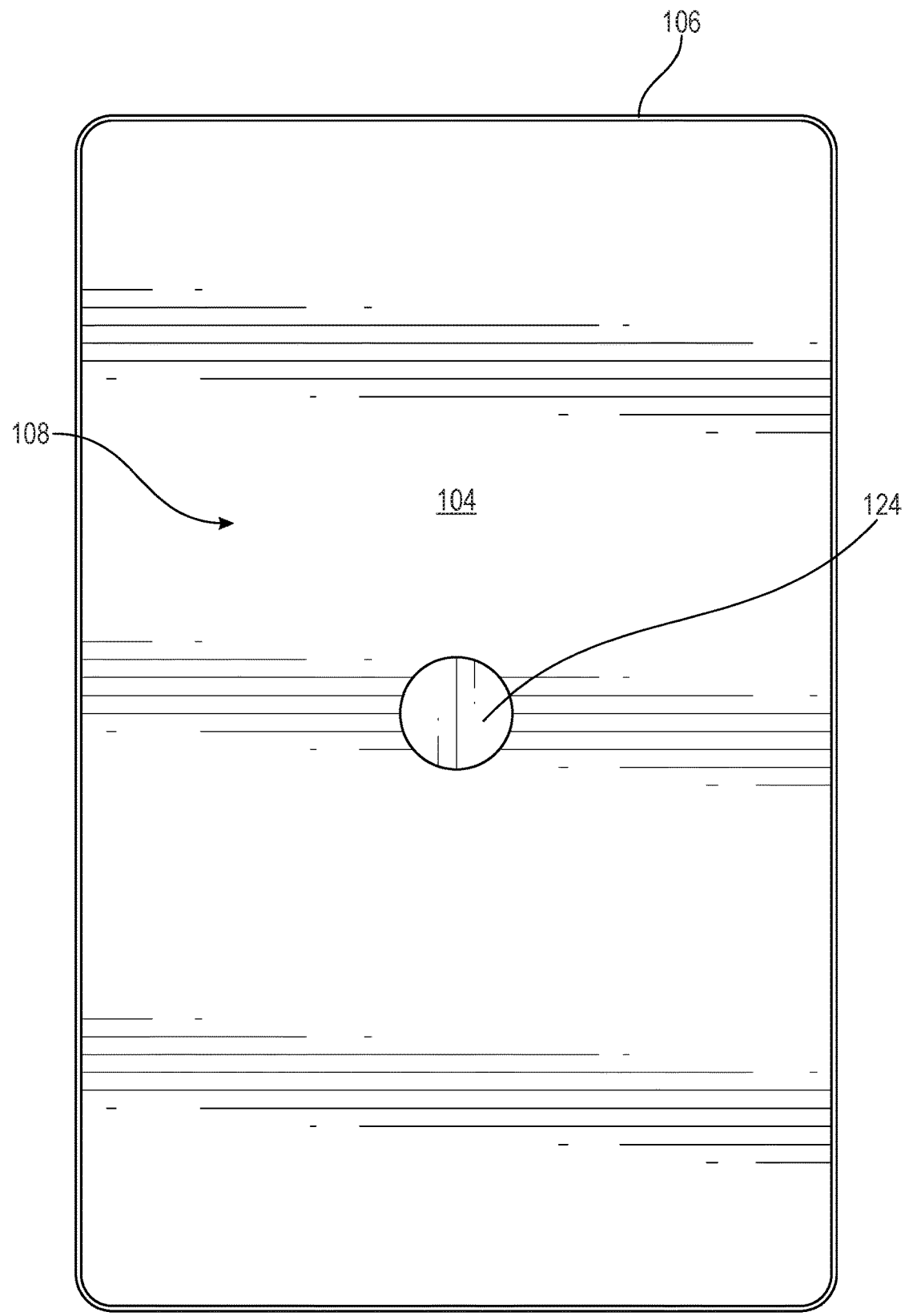
FIG. 3 illustrates a rear elevation view of a gang box lid.
Figure 4:
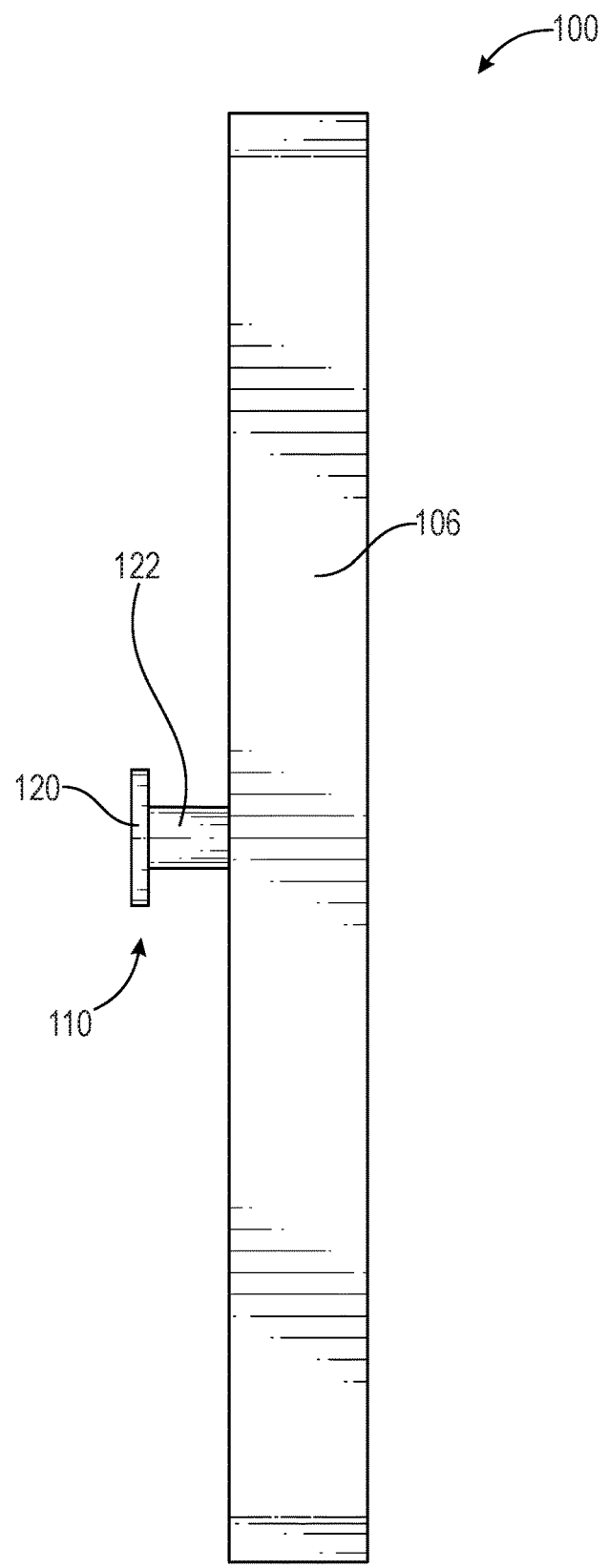
FIG. 4 illustrates a right side elevation view of a gang box lid, the left side being a mirror image thereof.
Figure 5:
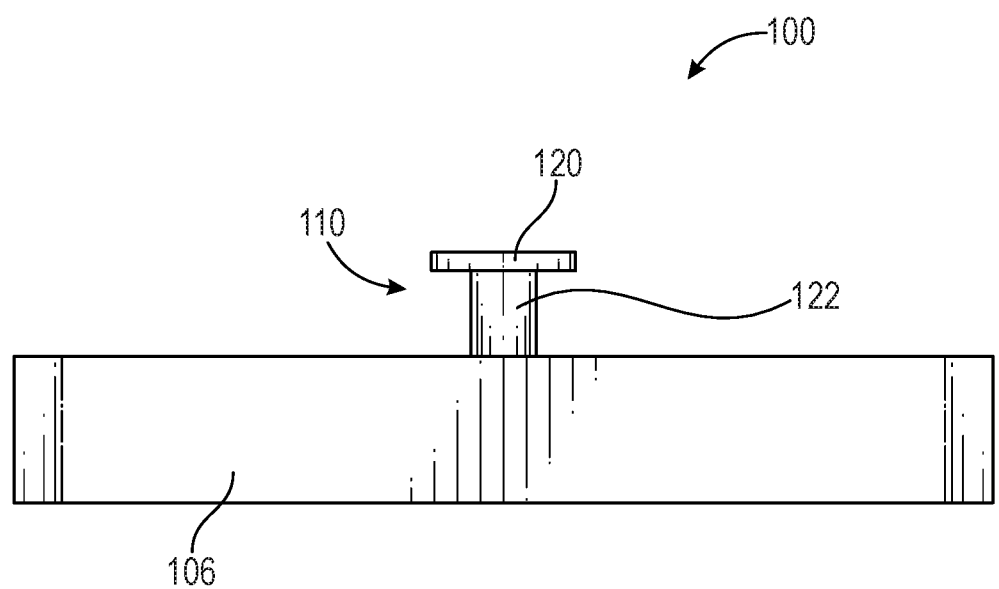
FIG. 5 illustrates a top plan view of a gang box lid, the bottom being a mirror image thereof.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for an apparatus that helps locate a gang box behind sheet material, aids a user in cutting around the gang box, and protects the contents of the gang box. The gang box lid disclosed herein solves these and other problems.

Figure 6:
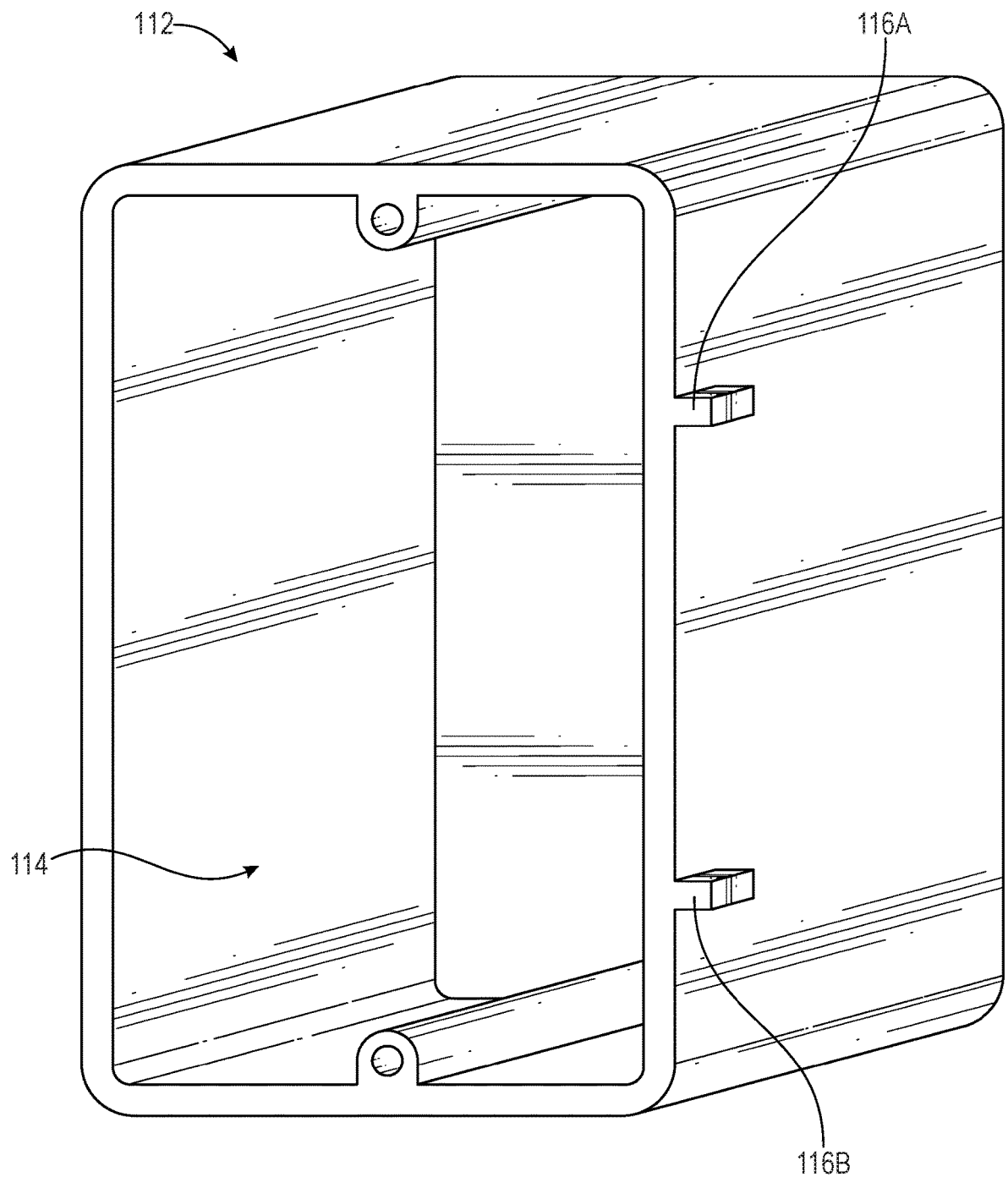
FIG. 6 illustrates a front perspective view of a gang box.

In some embodiments, as shown in FIGS. 1-5, a gang box lid 100 comprises an outer surface 102, an inner surface 104, an outer lip 106 extending substantially perpendicularly from the perimeter of the outer surface 102 and defining an interior lid space 108, and a retractable protrusion 110. The outer lip 106 has an inner perimeter larger than the external perimeter of a gang box 112 (FIGS. 6-7) so that the interior lid space 108 receives and covers the opening 114 of the gang box 112 and any protrusions 116A-B that may be found on an exterior edge of the gang box 112.

The gang box lid 100 is preferably manufactured from metals, or at least the outer surface is made from, or comprises, metals; however, it will be appreciated that any material may be used that is rigid enough to withstand the force of a drill, knife, or other cutting tool at initial contact, which may include plastics, carbon fibers, fiberglass, etc. For example, a user will place the gang box lid 100 on the gang box 112 to cover the opening 114. The user will then hang a sheet material (e.g., gypsum) which covers the gang box 112 and lid 100 thereon. A user may then use a knife, saw, router, drill bit, or other cutting tool (each a "cutting tool") to penetrate the sheet material to locate the gang box 112. Upon doing so, the cutting tool makes contact with the lid 100, which prohibits entry into the gang box opening 114. A user can then force the cutting tool horizontally or vertically along the outer surface 102 until reaching an end. Accordingly, the material of the gang box lid 100 should withstand the pressure of a cutting tool at initial impact and sliding along its surface.

It will be appreciated that the gang box lid 100 may remain removably coupled to the gang box 112 by gravity, by interference fit, or may also use hooks, latches, adhesives, or any other mechanism to removably couple the gang box lid 100 to the gang box 112.

In some embodiments, as seen in FIGS. 1-5, the retractable protrusion 110 is slidable within an aperture 118. The protrusion 110 may have a head 120 for contacting the outer surface 102, a neck 122 coupled to the head 120 and passing through the aperture 118, and a stopper 124 coupled to the opposite end of the neck 122. The head 120 prevents the retractable protrusion 110 from falling out of the gang box lid 100 in a first direction, while the stopper 124 prevents the retractable protrusion from falling out in a second direction. As a result, the retractable protrusion may freely slide back-and-forth within the aperture 118. This is beneficial for removing the gang box lid 100 from the gang box 112.

For example, when sheet material is pressed against the gang box lid 100, the retractable protrusion is forced through the aperture 118 until the head 120 contacts the outer surface 102. The head is ideally flat so as to allow a near flush fit. After the sheet material is cut and removed, and the desired amount of construction is completed, a user may grasp the head 120 to extend the retractable protrusion 110 until the stopper 124 makes contact with the inner surface 104, at which point the lid 100 is pulled free from the gang box 112. If needed, a user may use a fingernail or blade or other instrument to initially extract and grasp the retractable protrusion 110.

In some embodiments, the retractable protrusion 110 comprises magnetic materials, allowing a user to place a magnet proximal to the head 120, thereby extracting it far enough to grasp and pull. In some embodiments, the entire gang box lid 100 comprises magnet materials, allowing a user to easily locate the gang box lid 100 behind the sheet material using a magnet. This is a major improvement over the prior art, as it allows a user to easily identify the exact location of the gang box lid 100 without measuring or drilling/cutting, saving time and preventing mistakes.

In some embodiments, the retractable protrusion is hinged to the outer surface 102. For example, a flap of material may be hingedly coupled to the exterior surface 102, thereby allowing the retractable protrusion to remain flat against the outer surface 102 until actuated by a user. The user may then easily grasp the retractable protrusion to remove the gang box lid 100 from the gang box 112.

While shown and described as having a retractable protrusion 110, a retractable protrusion 110 is not required. A user may use a magnet against the outer surface 102 to remove it, or other methods of removing the gang box lid 100 from the gang box 112.

Figure 7:
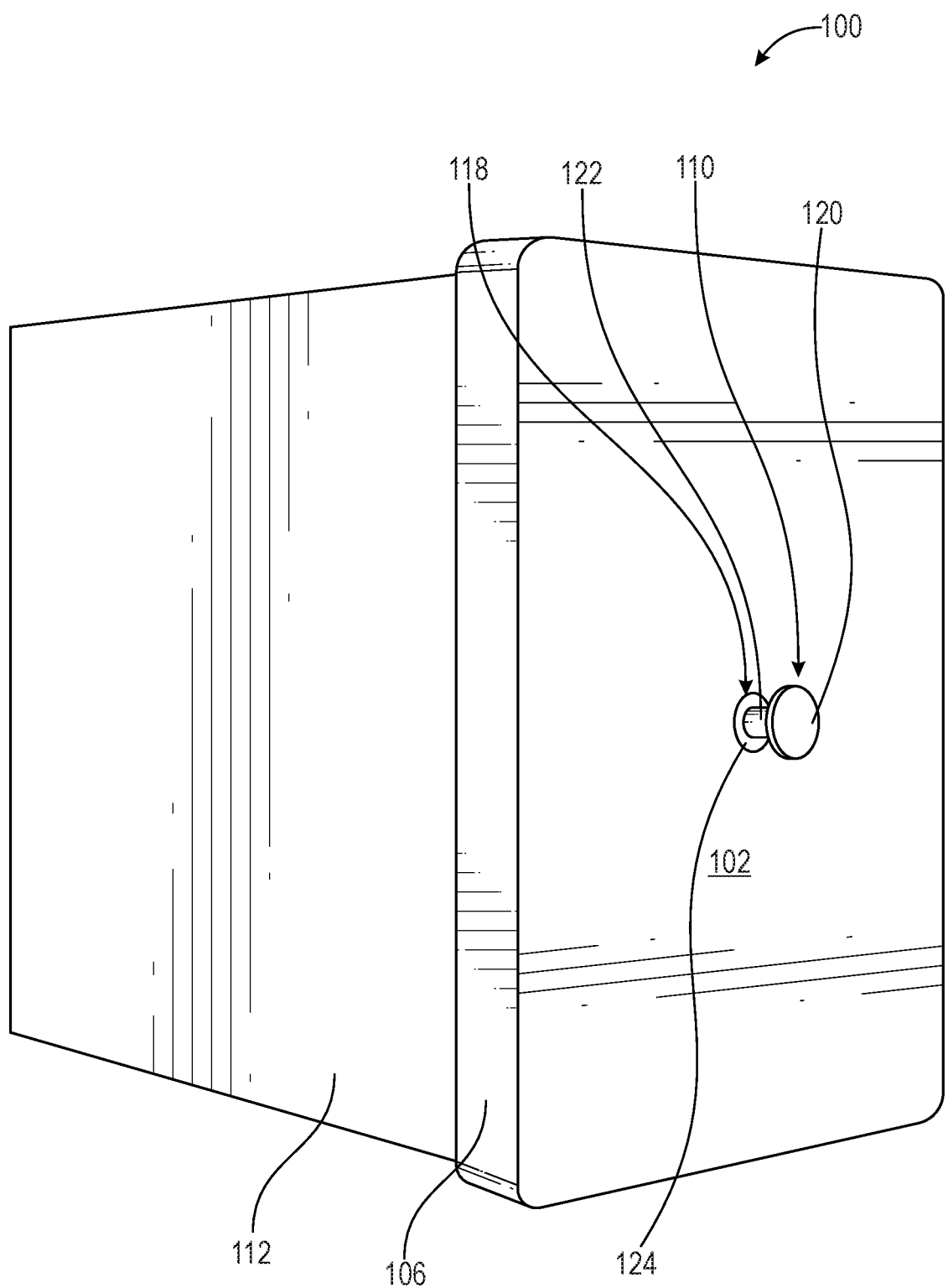
FIG. 7 illustrates a front perspective view of a gang box lid coupled to a gang box.

As best seen in FIG. 7, the outer lip 106 not only helps cover and secure the gang box lid 100 to the gang box 112, but it also prevents damage to the gang box 112 and its contents. The lid 100 prevents debris from entering the gang box opening 114 while the outer lip 106 prevents the thin walls of the gang box 112 from being damaged by a drill, knife, or other cutting tool. It also creates a smooth surface for a user to run their cutting tool along, tracing the perimeter of the gang box lid 100, thereby ensuring an easier and more accurate cut around the gang box 112.

Figure 8:
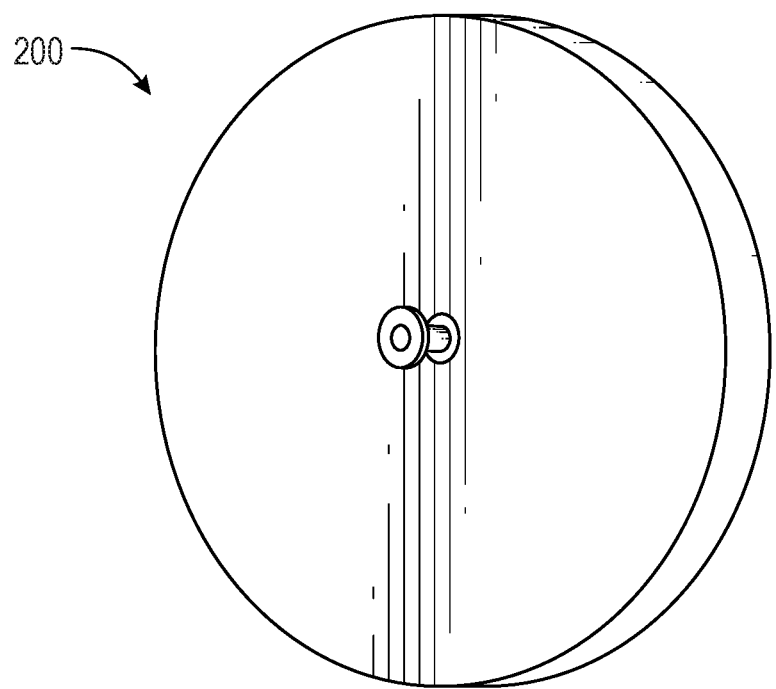
FIG. 8 illustrates a front perspective view of a gang box lid.
Figure 9:
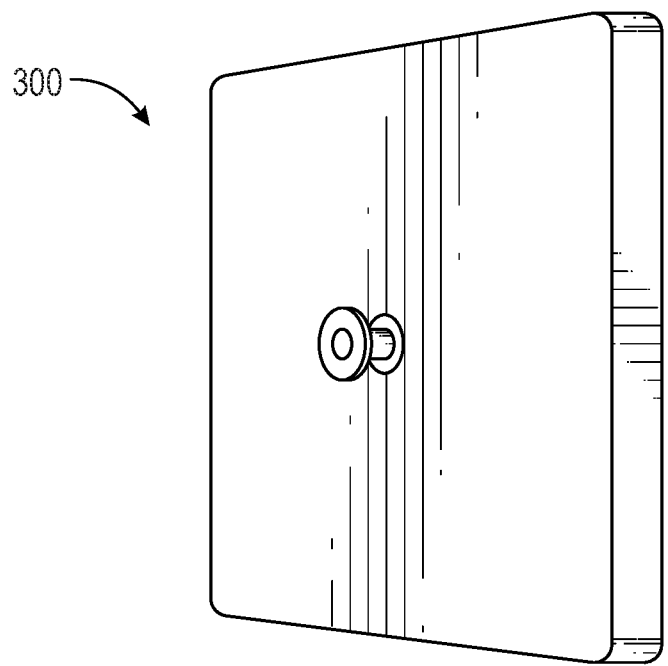
FIG. 9 illustrates a front perspective view of a gang box lid.

As shown in FIGS. 8 and 9, the gang box lid 200, 300 may be circular, square, or any other form factor that is complementary to gang box being used.

Accordingly, in one method of use, a user would couple a gang box lid 100 to a gang box 112 to cover the gang box opening 114. A user would then place sheet material over the gang box lid 100. Once the sheet material is hung, a user would locate the gang box lid 100, such as by using magnetics, measurements, etc. Once the gang box lid 100 is located, a user may use a knife, saw, router, drill bit, or other cutting tool to penetrate the sheet material, contacting the outer surface 102 of the lid 100. A user may then force their preferred cutting tool horizontally or vertically through the sheet material and across the outer surface 102 until an edge is found. Upon finding an edge, a user may then trace the gang box lid 100 by running the cutting tool around the perimeter of the gang box lid 100, with the outer lip 106 preventing the gang box 112 from damage. With the sheet material removed, the user may complete their construction, which may include texturing, painting, etc., while leaving the gang box lid 100 in place on the gang box 112. Once construction is complete, a user may then remove the gang box lid 100 from the gang box 112, such as by grasping and pulling on a retractable protrusion 110. As a result, the gang box 112 and its contents remain undamaged.

Therefore, it will be understood from the foregoing that the gang box lid 100 solves the need for an apparatus that helps locate a gang box behind sheet material, aids a user in cutting around the gang box, and protects the contents of the gang box.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A gang box lid, comprising:
   an outer surface;
   an inner surface; and
   an outer lip extending substantially perpendicularly from a perimeter of the outer surface, the outer lip defining an interior lid space;
   wherein an internal perimeter of the outer lip is greater than an outer perimeter of a gang box; and
   a retractable protrusion comprising a head for contacting the outer surface, a neck passing through an aperture, and a stopper for contacting the inner surface.

2. The gang box lid of claim 1, wherein at least the outer surface comprises metal.

3. The gang box lid of claim 1, wherein at least the outer surface is magnetic.

* * * * *